F. A. SCALFARO AND J. A. McLEOD.
ELECTRIC CLOTH CUTTER.
APPLICATION FILED JUNE 21, 1920.

1,395,150.

Patented Oct. 25, 1921.

INVENTORS
F. A. Scalfaro
J. A. McLeod
BY
Munn & Co
ATTORNEYS

UNITED STATES PATENT OFFICE.

FRANK A. SCALFARO AND JOHN A. McLEOD, OF CHICAGO, ILLINOIS.

ELECTRIC CLOTH-CUTTER.

1,395,150. Specification of Letters Patent. Patented Oct. 25, 1921.

Application filed June 21, 1920. Serial No. 390,447.

*To all whom it may concern:*

Be it known that we, FRANK A. SCALFARO and JOHN A. McLEOD, both citizens of the United States, and residents of Chicago, in the county of Cook and State of Illinois, have invented a new and useful Improvement in Electric Cloth-Cutters, of which the following is a full, clear, and exact description.

Our invention relates to improvements in electric cloth cutters, and it consists in the combinations, constructions, and arrangements herein described and claimed.

An object of our invention is to provide a cloth cutting device comprising a substantially triangular frame having its rearward side formed into a handle and being adapted to be slidably moved on its base, a cutting blade being mounted at the forward end of the device and the electrical mechanism for operating the blade being positioned along the diagonally extending upper side thereof, wherefor the device may be guided as desired, since the cloth is under the observation of the operator until engaged by the cutting blade.

A further object of our invention is to provide a device of the type described that has a removable cutting blade which may be quickly and easily removed for sharpening or to permit substitution of another blade.

A further object of our invention is to provide a device of the type described that can be operated at a small cost, is strong and durable in construction, and easily operated.

A further object of our invention is to provide a device of the type described that is thoroughly practical commercially.

Other objects and advantages will appear in the following specification, and the novel features of the invention will be particularly pointed out in the appended claims.

Our invention is illustrated in the accompanying drawings, forming part of this application, in which—

Figure 1:
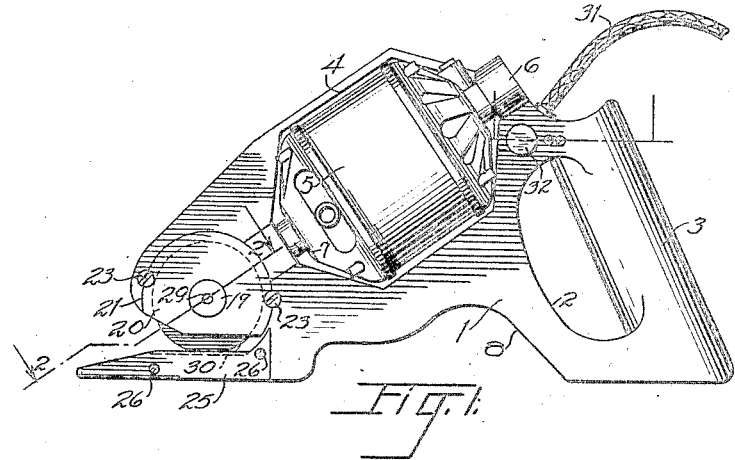
Figure 1 is a side elevation of the device.

We are aware that electrically operated cloth cutting devices having the electrical driving mechanism mounted upon the cutting blade and having a handle projecting laterally therefrom are in common use. We are not aware, however, of any device prior to our invention comprising a substantially rectangular frame provided with a handle at its rearward end and having a cutting blade at its forward end, the driving mechanism being positioned between the handle and the cutting blade out of the line of vision from the operator of the device to the work being engaged, whereby the latter is under observation until actually brought into contact with the cutting blade.

In carrying out our invention, we provide a supporting frame whose outline substantially describes a right angle triangle whose hypotenuse coincides with the base line of the frame. The frame in the form of the device now preferred by us comprises a flat metallic vertically disposed plate 1 whose rearward side consists of a rounded handle 3, an aperture 2 being provided to permit the handle 3 being conveniently grasped by the hand of an operator. An aperture 4 is provided in the plate 1, as shown, and a motor 5 is disposed therein, bearings 6 and 7, which are formed integral with the plate 1 or rigidly secured thereto, being provided for supporting the motor 5 at its rearward and forward ends. The plate 1 is cut away along its base line at 8 for a purpose which will be hereinafter set forth.

A lateral extension 9 to the plate 1 is joined to the handle 3 at its lower and upper ends, a portion of the base line of the extension being horizontally alined with the base line of the plate 1. Consequently, the device will remain in its upright position, such as pictured in Fig. 1 of the drawings when released by the operator. The lateral extension 9, which is rigidly secured along its entire length to the plate 1 has its forward portion positioned beneath the motor 5, thereby providing a guard to protect the cloth, which may be disposed beneath the device, from oil or the like, which may be ejected from the motor during the operation of the latter.

Figures 2, 3:
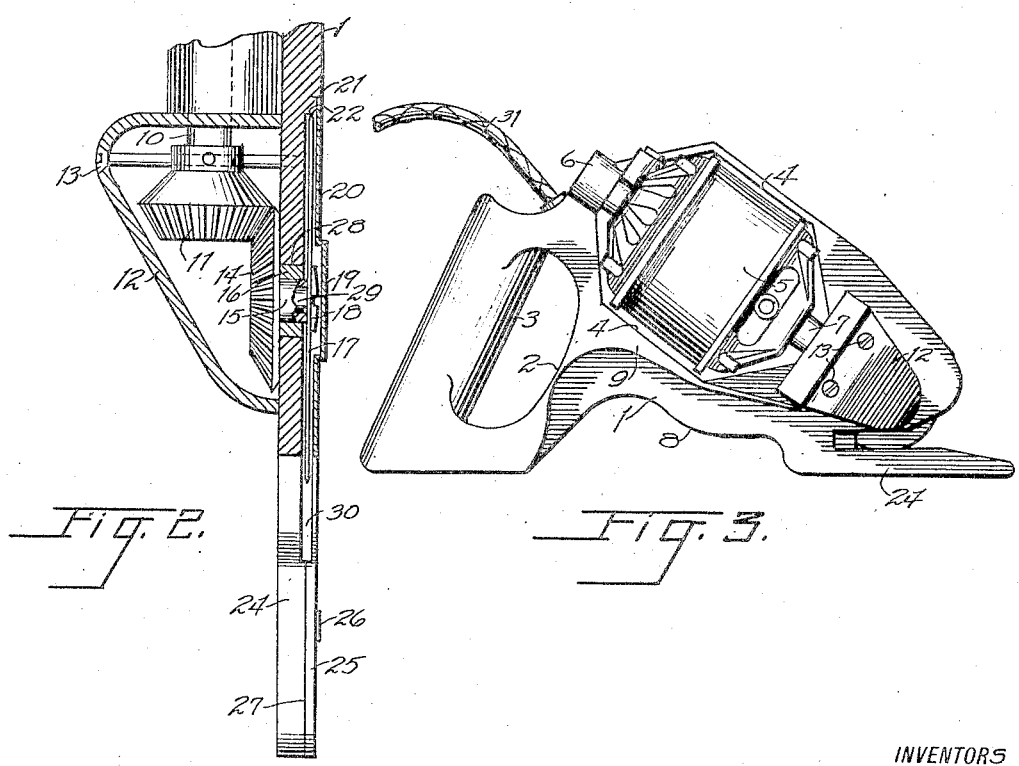
Fig. 2 is an enlarged sectional view along the line 2—2 of Fig. 1.
Fig. 3 is a view in elevation of the reverse side of the device to that pictured in Fig. 1.

The drive shaft 10 of the motor 5 extends through the bearing 7 and has a bevel gear 11 secured at its end. The bevel gear 11 is in mesh with a bevel gear 14. The bevel gear 14 is carried at the end of a stub shaft 15, which is journaled in a bushing 16. The latter is positioned in an opening 28, which extends transversely through the plate 1. A housing 12 covers the meshed gears 11 and 14 and is secured to the plate 1 in any suitable manner as by means of screws 13. A cutting blade 17 of the rotary type is rigidly secured at its center to the outer end of the stub shaft 15 in any suitable manner, as by means of a screw 18, which is screwed in a threaded opening in the end of the stub shaft. It will be observed that a circular recess 22 is provided in the side wall of the plate 1, the rotary cutting blade 17 being disposed therein. A cap 20 having a laterally extending central portion 19 forms a guard for the blade 17 and has its outer edge arranged in a recess 21 in the plate 1, as best seen in Fig. 2 of the drawings. The laterally extending central portion 19 accommodates the head of the screw 18 that secures the cutting blade to the end of the stub shaft. An opening 29 is provided to permit oiling of the cutting blade without the necessity of removing the cap or guard 20. The cap or guard 20 may be removably secured in place in any suitable manner, as by means of screws 23.

The forward portion of the plate 1 is formed, as shown, and extends beyond the periphery of the rotary cutting blade 17, thereby providing a guiding finger 24, which has a groove 30 adapted to receive the cutting edge of the rotating blade, and to coöperate therewith. A guard 25, which conforms in shape with the guiding finger 24 is secured thereto by means of screws 26, being received within a recess 27.

From the foregoing description of the various parts of the device, the operation thereof may be readily understood. The motor 5 is excited when connection has been made with electrical conducting means, through the medium of the electrical conducting wires 31, which are suitable for connection with an ordinary electrical socket. The circuit is closed by means of a push-button 32, which is positioned conveniently near the handle 3. Motion will be transmitted to the rotary cutting blade 17 from the drive shaft 10 through the meshed bevel gears 11 and 15. The device may be guided along the table or the like on which cloth to be cut is disposed. The cloth will be guided over the guiding finger 24 into position to be cut by the rotary blade 17. Since the driving mechanism is positioned between the cutting blade and the handle, as shown, the cloth is under observation until actually engaged by the cutting blade and it is therefore possible to cut a cloth as desired, as for instance, along a marked line. Furthermore, since a portion of the plate 1 is cut away along its base line, the cloth will not gather beneath the frame to interfere with the operation of the device.

The device presents a convenient and effective means for quickly cutting cloth as desired, whereby a great saving of time and labor results.

We claim:

1. A cloth cutting device comprising a substantially triangular frame having its inclined rearward side formed into a handle portion and being adapted to be slidably moved along a flat surface, a rotary cutting blade mounted at the forward end of the frame, an electrically actuated driving mechanism disposed along the inclined upper side of said frame and operatively connected with the cutting blade, and means positioned beneath the cutting blade and extending forwardly thereof for guiding work into position to be cut by the rotary cutting blade.

2. A cloth cutting device comprising a substantially triangular frame having its inclined rearward side formed into a handle portion and being adapted to be slidably moved along a flat surface, a rotary cutting blade mounted at the forward end of the frame, an electrically actuated driving mechanism disposed along the inclined upper side of said frame and operatively connected with the cutting blade, and means positioned beneath the cutting blade and extending forwardly thereof for guiding work into position to be cut by the rotary cutting blade, said last named means comprising a guiding finger having its lower side horizontally alined with the base of said frame and having its upper side tapering toward the forward end thereof.

3. A cloth cutting device comprising a substantially triangular frame having its inclined rearward side formed into a handle and being adapted for slidable movement along a flat surface, said frame having a portion of its base cut away intermediate its length and being formed with an aperture along its inclined upper edge, a rotary cutting blade carried by said frame at its forward end, a motor mounted in the aperture along the upper edge of said frame, means for operatively connecting the rotary cutting blade with the drive shaft of said motor, and means positioned beneath the cutting blade and extending forwardly therebeyond for guiding cloth into position to be cut by the blade.

FRANK A. SCALFARO.
JOHN A. McLEOD.